United States Patent
Lin (10) Patent No.: US 10,241,678 B2
(45) Date of Patent: Mar. 26, 2019

(54) DATA STORAGE DEVICE AND DATA WRITING METHOD CAPABLE OF AVOIDING REPEATED WRITE OPERATION OF A TLC BLOCK WHEN INTERRUPTED

(71) Applicant: Silicon Motion, Inc., Jhubei (TW)

(72) Inventor: Wen-Sheng Lin, Kaohsiung (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/659,214

(22) Filed: Jul. 25, 2017

(65) Prior Publication Data
US 2018/0101303 A1 Apr. 12, 2018

(30) Foreign Application Priority Data

Oct. 11, 2016 (TW) .............................. 105132699 A (51) Int. Cl.
*G06F 3/06* (2006.01)
*G06F 12/02* (2006.01)
*G06F 12/10* (2016.01)

(52) U.S. Cl.
CPC ........ *G06F 3/0604* (2013.01); *G06F 12/0246* (2013.01); *G06F 12/10* (2013.01); *G06F 3/064* (2013.01); *G06F 2212/657* (2013.01); *G06F 2212/7201* (2013.01)

(58) Field of Classification Search
CPC ... G11C 11/5628; G11C 16/10; G11C 16/102; G11C 16/105; G06F 11/14
See application file for complete search history.

(56) References Cited

U.S. PATENT DOCUMENTS

| | | | | |
|---|---|---|---|---|
| 8,054,684 B2* | 11/2011 | Gorobets | ............ | G11C 11/5628 365/185.03 |
| 8,750,042 B2* | 6/2014 | Sharon | ................ | G11C 11/5642 365/185.03 |
| 8,909,986 B2* | 12/2014 | Huang | ................ | G06F 12/0246 714/6.32 |
| 2010/0042773 A1 | 2/2010 | Yeh | | |

(Continued)

FOREIGN PATENT DOCUMENTS

| TW | 201411351 A | 3/2014 |
|---|---|---|
| TW | I470432 B | 1/2015 |

(Continued)

OTHER PUBLICATIONS

Office Action of corresponding TW application, published on Dec. 11, 2017.

(Continued)

*Primary Examiner* — Vanthu T Nguyen
(74) *Attorney, Agent, or Firm* — Wang Law Firm, Inc.

(57) ABSTRACT

The present invention provides a data storage device that includes a flash memory and a controller. The flash memory has a plurality of TLC blocks, wherein each of the TLC blocks includes a plurality of pages. When the data storage device resumes operation after a power-off event, the controller stops writing data into a first TLC block which was undergoing a write operation that had not finished at the time the power-off event occurred, and the controller writes valid data of the first TLC block into a second TLC block after every interval of a first predetermined number of write commands is finished.

16 Claims, 8 Drawing Sheets

(56) References Cited

U.S. PATENT DOCUMENTS

| | | | | |
|---|---|---|---|---|
| 2011/0153912 A1* | 6/2011 | Gorobets | ............ | G11C 11/5628 |
| | | | | 711/103 |
| 2012/0297122 A1* | 11/2012 | Gorobets | ............ | G06F 12/0246 |
| | | | | 711/103 |
| 2012/0297248 A1* | 11/2012 | Bennett | ............... | G06F 12/0246 |
| | | | | 714/16 |
| 2014/0006688 A1 | 1/2014 | Yu et al. | | |
| 2017/0185336 A1* | 6/2017 | Byun | .................... | G06F 3/0625 |

FOREIGN PATENT DOCUMENTS

| | | |
|---|---|---|
| TW | I470435 B | 1/2015 |
| TW | 201530310 A | 8/2015 |

OTHER PUBLICATIONS

Office Action of corresponding TW application, published on Apr. 30, 2018.
Office Action of corresponding TW application 105132699, published on May 25, 2017.

* cited by examiner

DATA STORAGE DEVICE AND DATA WRITING METHOD CAPABLE OF AVOIDING REPEATED WRITE OPERATION OF A TLC BLOCK WHEN INTERRUPTED

CROSS REFERENCE TO RELATED APPLICATIONS

This Application claims priority of Taiwan Patent Application No. 105132699, filed on Oct. 11, 2016, the entirety of which is incorporated by reference herein.

BACKGROUND OF THE INVENTION

Field of the Invention

The present invention relates to a data writing method of a data storage device, and in particular to a data writing method with a Triple-Level Cell mode.

Description of the Related Art

Flash memory is considered a non-volatile data-storage device that uses electrical methods to erase and program itself. NAND Flash, for example, is often used in memory cards, USB flash devices, solid state devices, eMMCs, and other memory devices.

Flash memory such as NAND Flash uses a multiple-block structure to store data, wherein flash memory uses floating gate transistors. The floating gates of the floating gate transistor may catch electronic charges for storing data. However, the electronics might undergo losses from the floating gate due to the operation of the flash memory or various environmental parameters, which can affect data retention. The Triple-Level Cell (TLC) of the flash memory is much more easily affected by the environment than a Single-Level Cell (SLC) or a Multi-Level Cell (MLC), especially when a power-off event occurs while the MLC is being written.

BRIEF SUMMARY OF THE INVENTION

A detailed description is given in the following embodiments with reference to the accompanying drawings.

An exemplary embodiment provides a data storage device that includes a flash memory and a controller. The flash memory has a plurality of TLC blocks, wherein each of the TLC blocks includes a plurality of pages. The controller stops writing data into a first TLC block which was undergoing a write operation that had not finished at the time a power-off event occurred, and when the data storage device resumes operation after the power-off event, the controller writes valid data of the first TLC block into a second TLC block after every interval of a first predetermined number of write commands is finished.

Another exemplary embodiment provides a data storage device that includes a flash memory and a controller. The flash memory has a plurality of SLC blocks and a plurality of TLC blocks, wherein each of the SLC blocks includes a plurality of pages, and each of the TLC block includes a plurality of pages. The controller writes valid data of a first TLC block into a second TLC block of the TLC blocks after every interval of a first predetermined number of write commands is finished in a first period which is subsequent to a power-off event after which the data storage device resumes operation, and writes a part of the valid data of the other SLC blocks after every interval of a second predetermined number of write commands is finished in a second period which is subsequent to the first period.

Another exemplary embodiment provides a data writing method applied to a data storage device, wherein the data storage device includes a flash memory having a plurality of TLC blocks, the data writing method includes: when the data storage device resumes operation after a power-off event, checking whether any of the TLC blocks was undergoing a write operation that had not finished at the time the power-off event occurred; when a first TLC block was undergoing a write operation that had not finished at the time the power-off event occurred, stopping the writing of data into the first TLC block, and selecting a second TLC block from the first TLC block; and after the data storage device resumes operation after the power-off event, writing valid data of the first TLC block into a second TLC block after every interval of a first predetermined number of write commands is finished.

Yet another exemplary embodiment provides a data writing method, applied to a data storage device, wherein the data storage device includes a flash memory having a plurality of SLC blocks and a plurality of TLC blocks. The data writing method includes: in a first period which is subsequent to a power-off event after which the data storage device resumes operation, writing valid data of a first TLC block into a second TLC block of the TLC blocks after every interval of a first predetermined number of write command(s) is finished; and in a second period which is subsequent to the first period, writing a part of the valid data of the other SLC blocks into the other TLC blocks after every interval of a second predetermined number of write commands is finished.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
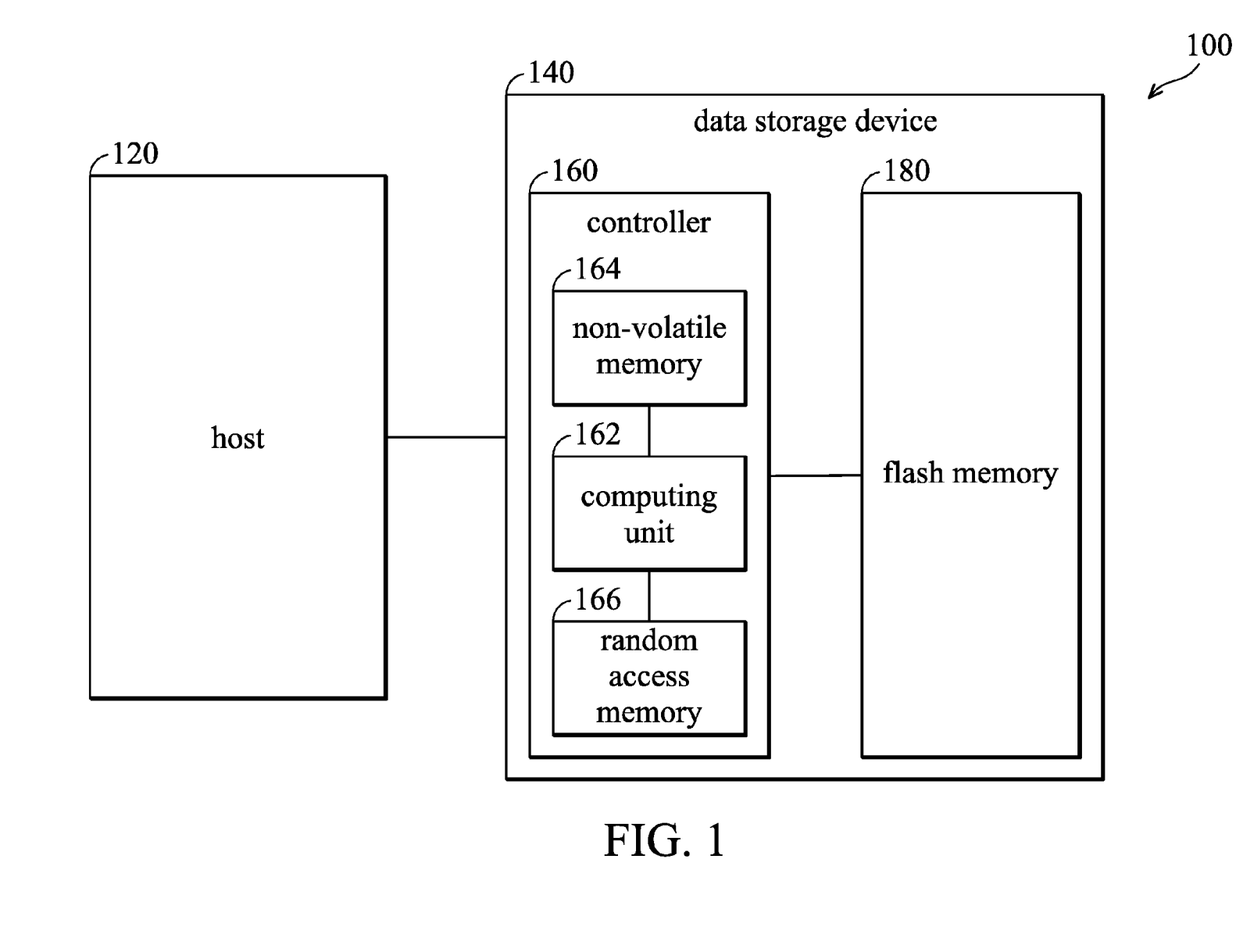
FIG. 1 is a schematic diagram illustrating an embodiment of an electronic system of an exemplary embodiment.

FIG. 1 is a schematic diagram illustrating an electronic system in accordance with an embodiment. The electronic system 100 includes a host 120 and a data storage device 140. The data storage device 140 includes a flash memory 180 and a controller 160, and operates in response to the commands of the host 120. The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware. The random access memory 166 is arranged to load the program codes and parameters for the controller 160, so that the controller 160 may use the loaded data to operate. The flash memory 180 includes a plurality of blocks, and each of the blocks has a plurality of pages, wherein the minimum write unit of the flash memory 180 is a page, and the minimum erase unit of the flash memory 180 is a block. In some embodiments, the controller 160 may include an error correction engine arranged to perform Error Correction on the read data and encode the write data to obtain the parity codes, wherein the error correction engine may obtain the error bits of data stored in the page by reading the page.

Figure 2:
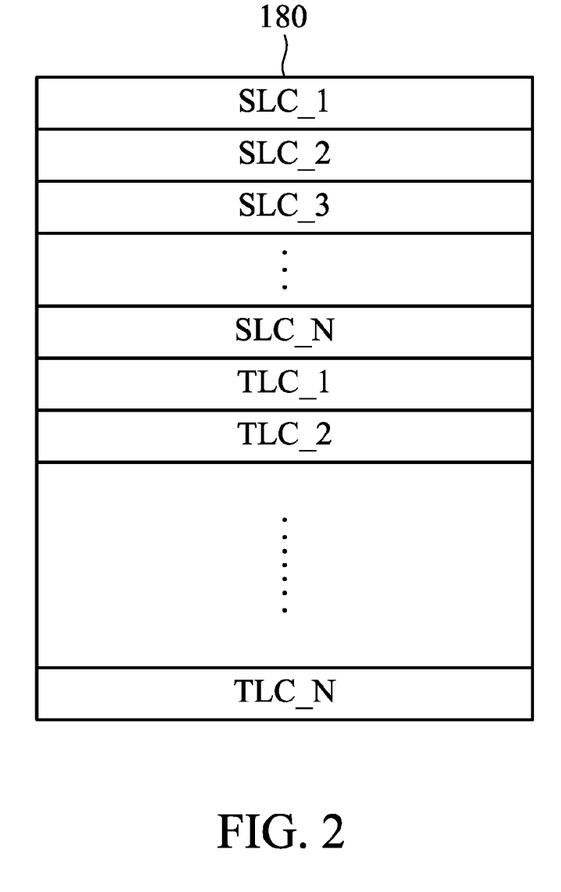
FIG. 2 is a schematic diagram illustrating an embodiment of a flash memory of an exemplary embodiment.

In one of the embodiments, the blocks of the flash memory 180 may include a plurality of SLC blocks SLC_1~SLC_N and a plurality of TLC blocks TLC_1~TLC_N (as shown in FIG. 2), wherein each of the SLC blocks SLC_1~SLC_N has a plurality of pages, and each of the TLC blocks TLC_1~TLC_N also has a plurality of pages. The SLC blocks SLC_1~SLC_N are arranged to be written with data by a Single-Level Cell mode (SLC mode), and the TLC blocks are arranged to be written with data by a Triple-Level Cell mode (TLC mode). Moreover, the memory space of each of the TLC blocks TLC_1~TLC_N is three times larger than the memory space of each of the SLC blocks SLC_1~SLC_N. More specifically, all of the pages of the TLC blocks and the SLC blocks have the same physical construction. However, a page of the TLC block has to be programmed by a specific voltage more than one time to be written with data, and a page of the SLC block only has to be programmed by a specific voltage one time to be written with data. In one embodiment, the page of the TLC block has to be programmed by a specific voltage three times to be written with data. Namely, the valid data of three SLC blocks can be written into one TLC block, but it is not limited thereto.

It should be noted that the flash memory 180 of the present invention is operated as Triple-Level Cell (TLC), and the flash memory 180 also includes some blocks arranged to be operated as Single-Level Cell (SLC). Before the data is stored into the TLC blocks TLC_1~TLC_N, the data has to be stored in the SLC blocks SLC_1~SLC_N first. During the period of storing data, the controller 160 is configured to read a predetermined number of SLC blocks a predetermined number of times to program the data of the read SLC blocks into a TLC block. More specifically, when the controller 160 needs to write data into a specific TLC block of the flash memory 180, the controller 160 will first write the data into a predetermined number of specific SLC blocks. Next, the controller 160 performs read operations a predetermined number of times on the specific SLC blocks to program the read data into the specific TLC block. Namely, the write operation of the TLC blocks is arranged to program the data stored in the predetermined number of SLC blocks into the TLC block. It should be noted that, in the present invention, the steps of programming the data stored in the SLC blocks into the TLC block are called a write operation. Moreover, write operations are usually executed in the background. Namely, when the data needs to be written into the flash memory 180, the controller 160 only needs to write the data into the SLC blocks, and the data storage device 140 or the host 120 will regard the data as being done writing into the flash memory 180, wherein the steps of writing the data into the SLC blocks are also called a write operation. Next, the controller 160 will schedule the write operation of TLC blocks in the background to move the data stored in the SLC blocks into the TLC blocks.

Figure 3:
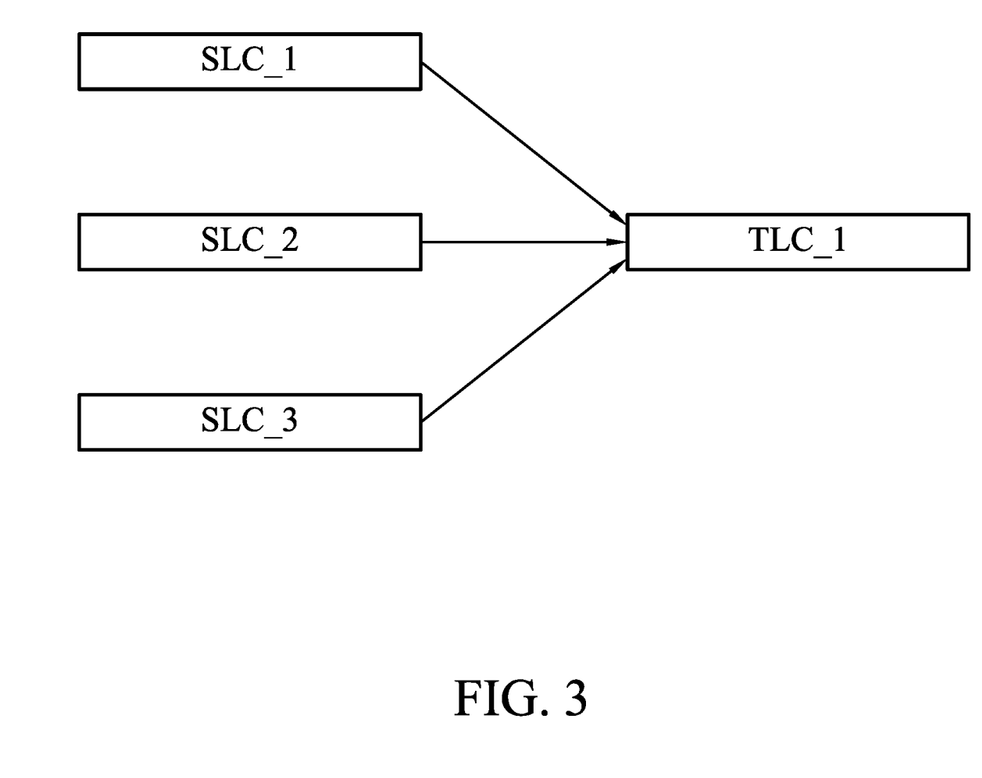
FIG. 3 is a schematic diagram illustrating the relationships between SLC and TLC blocks in accordance with an embodiment.

In one embodiment, the predetermined number of SLC blocks is three, but it is not limited thereto. In other embodiments, the predetermined number can be 4, 5, 6, 7, 8 or another positive integer. For example, the controller 160 is required to write data into a specific TLC block TLC_1 of the flash memory 180, as shown in FIG. 3. Firstly, the controller 160 writes the data into three of the specific SLC blocks SLC_1~SLC_3. Next, the controller 160 performs a first read operation on the first page of each of the specific SLC blocks SLC_1~SLC_3 to program the first page of the specific TLC block TLC_1 according to the data read from the first pages of the specific SLC blocks SLC_1~SLC_3 for the first time. Next, the controller 160 performs a second read operation on the same first page of each of the specific SLC blocks SLC_1~SLC_3 to program the same first page of the specific TLC block TLC_1 according to the data read from the first pages of the specific SLC blocks SLC_1~SLC_3 for the second time. Lastly, the controller 160 performs a third read operation on the same first page of each of the specific SLC blocks SLC_1~SLC_3 to program the same first page of the specific TLC block TLC_1 according to the data read from the first pages of the specific SLC blocks SLC_1~SLC_3 for the third time. From the above programming three times, the data stored in the first page of each of the SLC blocks SLC_1~SLC_3 has been written into the first page of the specific TLC block TLC_1. Similarly, the controller 160 continues to repeat the above steps until the data of all the pages of the specific SLC blocks SLC_1~SLC_3 has been written into the specific TLC block TLC_1.

As described above, writing the TLC blocks TLC_1~TLC_N takes more time than writing the SLC blocks. Therefore, there is a higher probability that a power-off event will occur during the write operations of TLC blocks TLC_1~TLC_N. In one embodiment, when a power-off event occurs during the write operation of a TLC block, the controller 160 selects a new TLC block and writes the data of the SLC blocks, which was arranged to be written into the original TLC block, into the new TLC block. It should be noted that the controller 160 may determine whether a power-off event occurred during the write operation of a TLC block according to the tables stored in the flash memory 180 (or other memory) when the data storage device 140 resumes operation after the power-off event. For example, the flash memory 180 may have a table arranged to record that a write operation of the page or block was started and another table arranged to record whether the write operation was finished. In this embodiment, the controller 160 may determine whether the write operation was interrupted according to the above two tables of the flash memory 180, but it is not limited thereto. In other embodiments, the data storage device 140 can also record the status of writing data according to at least one table or flag. Moreover, if any of the pages of the TLC block has not been written, the write operation of the TLC block is not finished.

It should be noted that the data storage device 140 has a maximum programming time to limit the time that the controller 160 spends on writing data into the TLC blocks TLC_1~TLC_N from the SLC blocks SLC_1~SLC_N in the background, because writing the TLC blocks TLC_1~TLC_N takes a long time. For example, due to the limitation imposed by the maximum programming time, the controller 160 cannot spend more than a predetermined amount of time to perform the write operation of the TLC blocks in background in the Nth write command, wherein the maximum programming time is arranged to accumulate the time that the controller 160 has been spending on the write operation. When the maximum programming time is longer than the predetermined time, the controller 160 must stop the write operation until the next N−1th write command is finished and the maximum programming time is reset to zero, but it is not limited thereto. In other embodiments, the maximum programming time can be a predetermined value, and the controller 160 will schedule the write operation of the TLC block according to the maximum programming time. In other embodiments, the controller 160 can also use the maximum programming time by other methods to control the write operation of the TLC block.

Figure 4:
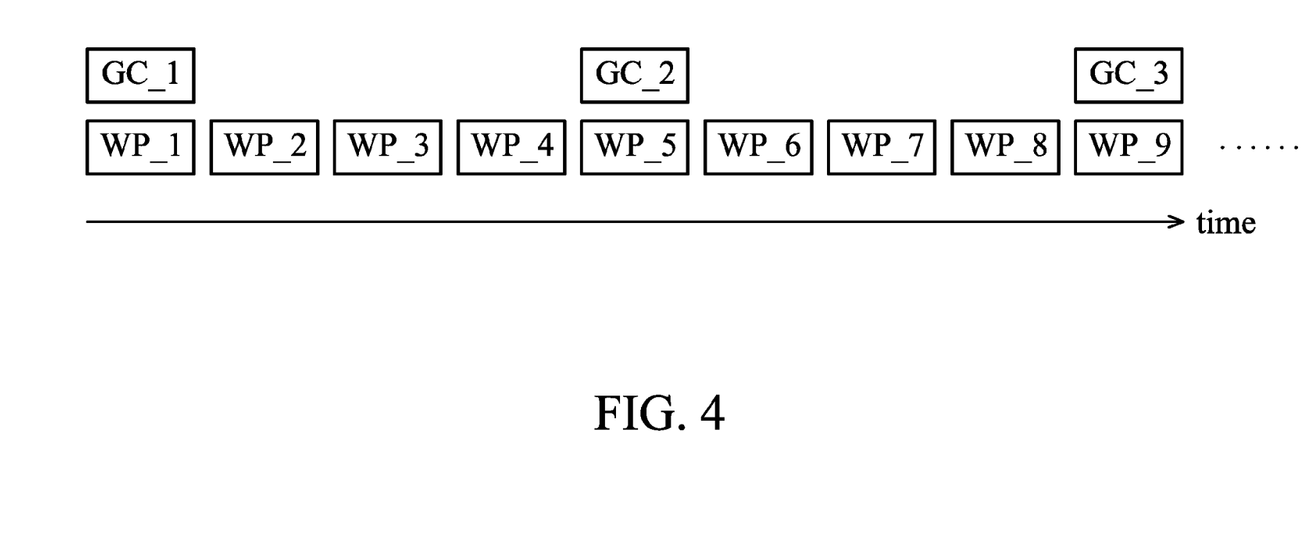
FIG. 4 is a schematic diagram illustrating a schedule in accordance with an embodiment.

As described above, the maximum programming time can avoid the data storage device 140 wasting too many resources in the background, so that it can also prevent the user from experiencing a lag during use. To avoid exceeding the limitation set by the maximum programming time, the controller 160 has to separate the write operation of one TLC block into intervals of a second predetermined number of write commands, as shown in FIG. 4. FIG. 4 is a schematic diagram illustrating a schedule in accordance with an embodiment, wherein WP_1~WP_9 are write operations of SLC blocks corresponding to different write commands, and GC_1~GC_3 are write operations of the TLC blocks. In one embodiment, each of the write operations WP_1~WP_9 is arranged to write one of the pages of one SLC block, and each of the write operations GC_1~GC_3 is arranged to write one of the pages of one TLC block, but it is not limited thereto. In other embodiments, each of the write operations WP_1~WP_9 can be arranged to write more than one page of one SLC block, and each of the write operations GC_1~GC_3 can also be arranged to write more than one page of one TLC block. In the embodiment of FIG. 4, due to the limitation imposed by the maximum programming time, the write operations GC_1~GC_3 of the TLC block are separated into three write operations of SLC blocks. Namely, the controller 160 writes the valid data stored in a predetermined number of SLC blocks into one TLC block after every interval of four write commands is finished. If one TLC block requires three write operations GC_1~GC_3 to be filled, the TLC block will be filled after the write operations WP_1~WP_9 corresponding to nine write commands are finished. It should be noted that FIG. 4 is just one of the embodiments of the present invention, wherein the number of write operations of TLC blocks and SLC blocks are not limited thereto.

In some conditions, such as the manufacturing process or testing process of the data storage device 140, the data storage device 140 is more likely to continually suffer from power failures. Therefore, the above method of assigning of write operations will cause the controller 160 to be unable to finish the current write operation of a TLC block, such that the resources of the controller 160 are wasted. For example, as shown in FIG. 4, the current write operation of the TLC block will not be able to finish, and the controller 160 will continually select new TLC blocks to perform the interrupted write operation if a power-off event occurs in the data storage device 140 before nine write commands are finished.

In view of this, in one of the embodiments of the present invention, the controller 160 can process the write operation of the first TLC block at a faster rate and then return to the normal rate to process the other write operations of other TLC blocks when resuming from a power-off event. More specifically, in a first period which is subsequent to a power-off event after which the data storage device 140 resumes operation, the controller 160 writes a part of the valid data which was arranged to be written into the first TLC block into another second TLC block after every interval of a first predetermined number of write commands is finished, wherein the first period ends when the second TLC block is filled. Moreover, the first TLC block was undergoing a write operation that had not finished at the time the power-off event occurred. It should be noted that, in this invention, "the write operation that had not finished" refers to a write operation which was started but not finished. In a second period which is subsequent to the first period, the controller 160 writes a part of the valid data stored in the other SLC blocks into other available TLC blocks after every interval of a second predetermined number of write commands is finished, wherein the first predetermined number is less than the second predetermined number. In one embodiment, the first predetermined number is 1, and the second predetermined number is 4, but it is not limited thereto. In other embodiments, the first predetermined number and the second predetermined number can be other values determined by the circuit designer. Moreover, in the first period, the controller 160 clears the maximum programming time (set to zero) after every interval of a part of the valid data is written into the first TLC block, such that the write operation of the first TLC block can continually be executed with the next write operation of the SLC block.

When the storage device 140 resumes operation after a power-off event, the controller 160 checks whether any of the TLC blocks was undergoing a write operation that had not finished at the time the power-off event occurred. When a first TLC block was undergoing a write operation that had not finished at the time the power-off event occurred, the controller 160 stops the write operation of the first TLC block which was interrupted by the power-off event, and selects a second TLC block from the other TLC blocks to write all of the valid data which was arranged to be written into the first TLC block into the second TLC block. Namely, the controller 160 writes the valid data stored in SLC blocks which was arranged to be written into the first TLC block into the second TLC block. It should be noted that the controller 160 selects a TLC block which is not the first TLC block and does not have valid data from the TLC blocks to serve as the second TLC block, but it is not limited thereto. In other embodiments, the controller 160 can also select the new TLC block according to the erase count, write count and/or other parameters. More specifically, when resuming operation after a power-off event, the controller 160 writes a part of the data which was arranged to be written into the first TLC block into at least one page of the selected second TLC block and clears the maximum programming time after every interval of a first predetermined number of write commands is finished until the second TLC block is filled by the data which was arranged to be written in the first TLC block. When the second TLC block is filled, the controller 160 writes valid data stored in a predetermined number of SLC blocks into available an TLC block after every interval of a second predetermined number of write commands is finished.

Figure 5:
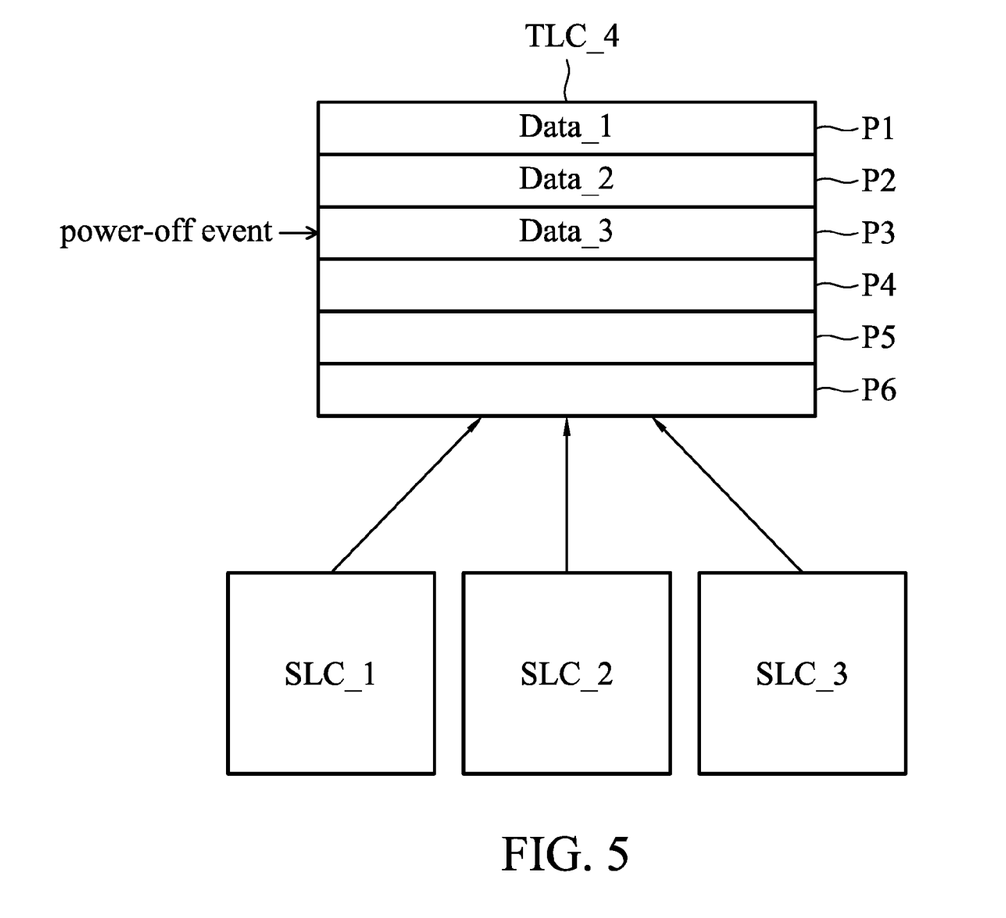
FIG. 5 is a schematic diagram illustrating a write operation of SLC and TLC blocks in accordance with an embodiment.
Figure 6:
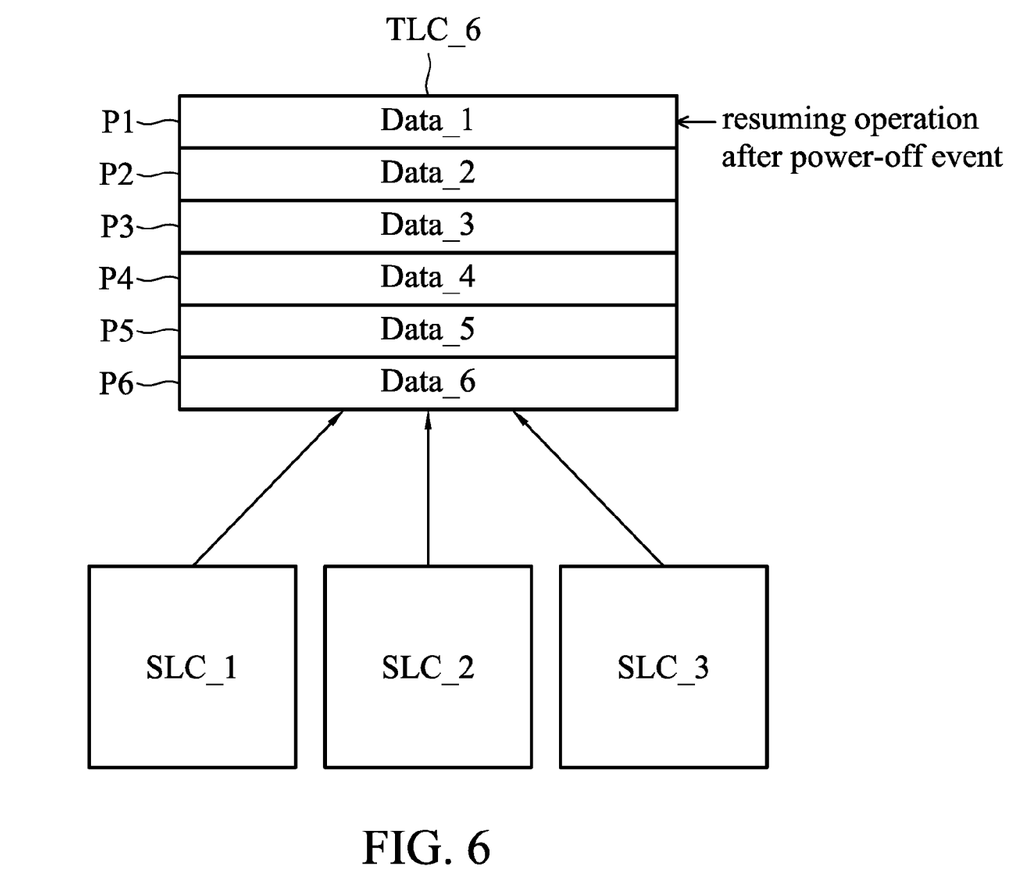
FIG. 6 is a schematic diagram illustrating a write operation of SLC and TLC blocks in accordance with another embodiment.

For example, as shown in FIG. 5, the controller 160 writes/programs the data sectors Data_1~Data_6 stored in the SLC blocks SLC_1~SLC_3 into the TLC block TLC_4. In this embodiment, the data sectors Data_1~Data_2 are respectively written into the pages P1~P2, and a power-off event occurs at the time the controller 160 is writing the data sector Data_3 into the page P3 of the TLC block TLC_4. When the data storage device 140 resumes operation after the power-off event, the controller 160 stops the write operation of the TLC block TLC_4 which was not finished at the time the power-off event occurred, and selects another TLC block TLC_6 from the TLC blocks to write the data which was arranged to be written into the TLC block TLC_4 into the TLC block TLC_6, as shown in FIG. 6. The schedule for the background operations can be referred to in FIG. 7.

Figure 7:
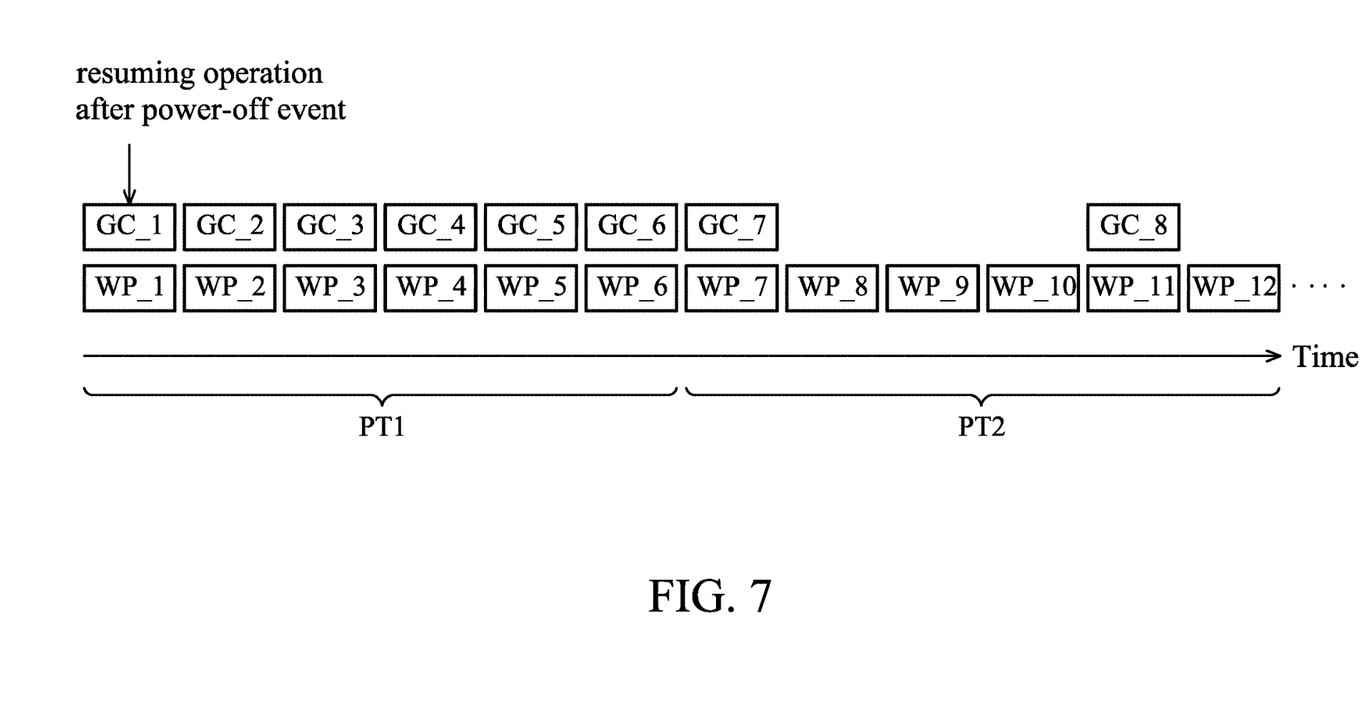
FIG. 7 is a schematic diagram illustrating a schedule in accordance with another embodiment.

As shown in FIG. 7, in a first period PT1 that is subsequent to a power-off event after which the data storage device 140 resumes operation, the controller 160 writes a part of the data, which was arranged to be written into the TLC block TLC_4, into the TLC block TLC_6 and clears the maximum programming time after every interval of one write command is finished. When all of the data sectors Data_1~Data_6 stored in the SLC blocks SLC_1~SLC_3 are written into the TLC block TLC_6, the first period PT1 ends. Namely, all of the data sectors Data_1~Data_6 stored in the SLC blocks SLC_1~SLC_3 are written into the TLC block TLC_6 (the write operation of the TLC block TLC_6 is done), and the first period PT1 ends. In this embodiment, each of the write operations WP_1~WP_12 of the SLC blocks is arranged to write one page of one SLC block, and each of the write operations GC_1~GC_8 of the TLC blocks is arranged to write one page of one TLC block, but it is not limited thereto. More specifically, the controller 160 writes data sector Data_1 into page P1 of TLC block TLC_6 and clears the maximum programming time in the write operation GC_1; writes data sector Data_2 into page P2 of TLC block TLC_6 and clears the maximum programming time in the write operation GC_2; writes data sector Data_3 into page P3 of TLC block TLC_6 and clears the maximum programming time in the write operation GC_3, and so on. In the second period PT2 which is subsequent to the first period PT1, after every interval of four write commands is finished, the controller 160 writes the data of other SLC blocks into other TLC blocks in the write operations GC_7, GC_8 of the SLC blocks. It should be noted that, in one embodiment, the time that is not in the first period PT1 is in the second period PT2.

Figure 8:
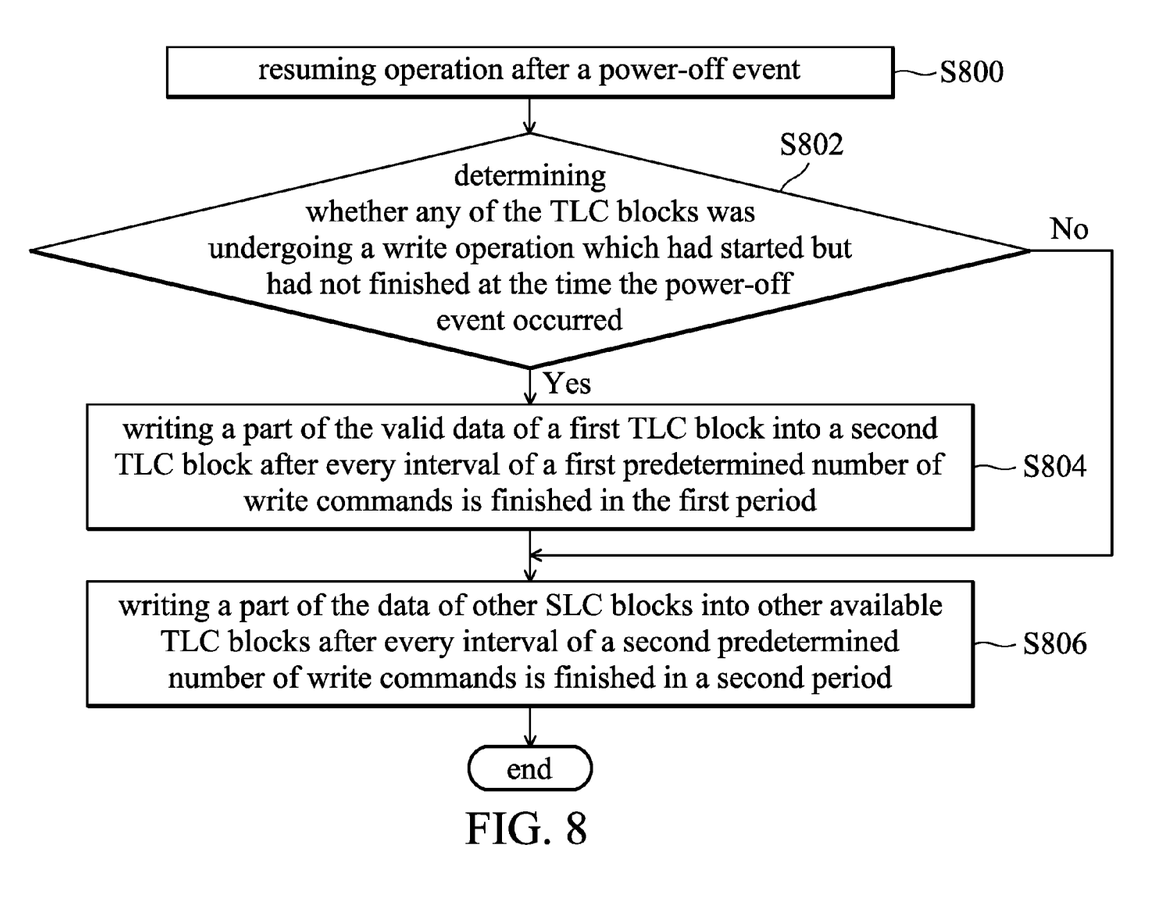
FIG. 8 is a flowchart of a data writing method in accordance with an embodiment.

FIG. 8 is a flowchart of a data writing method in accordance with an embodiment. The data writing method is applied to the data storage device 140 of FIG. 1. The process starts at step S800.

In step S800, the data storage device 140 resumes operation after a power-off event. It should be noted that the power-off event of the present invention includes events in which the power of the data storage device 140 is expectedly or unexpectedly cut off, but it is not limited thereto. In other embodiments, the power-off event may be an event in which power to the data storage device 140 is cut off unexpectedly.

Next, in step S802, the controller 160 determines whether any of the TLC blocks of the flash memory 180 was undergoing a write operation which had started but had not finished at the time the power-off event occurred. When the controller 160 determines that a first TLC block was undergoing a write operation which had started and had not finished at the time the power-off event occurred, the process goes to step S804 to enter a first period; otherwise the process bypasses the first period and goes to step S806 to directly enter the second period.

In step S804, in the first period, the controller 160 writes a part of the valid data of a first TLC block into a second TLC block after every interval of a first predetermined number of write commands is finished. When the second TLC block is filled, the first period ends and the process goes to step S806. In one of the embodiments, after every interval of the first predetermined number of write commands is finished, the controller 160 further clears the maximum programming time, such that the write operation of the TLC block can continually be executed with the write operation of next SLC block, but it is not limited thereto. It should be noted that the write operations of writing the data which was arranged to be written into the first TLC block into the second TLC block can be scheduled before, after or during the first write command executed in step S804, but it is not limited thereto. In other embodiments, the write operation can also be arranged in step S804 in other ways. Moreover, the controller 160 is arranged to select the TLC block which is not the first TLC block and does not have valid data to serve as the new TLC block, but it is not limited thereto. In other embodiments, the controller 160 can also select a new TLC block according to the erase count, write count and/or other parameters.

In step S806, in a second period which is subsequent to the first period, the controller 160 writes a part of the data of other SLC blocks into other available TLC blocks after every interval of a second predetermined number of write commands is finished, wherein the first predetermined number is less than the second predetermined number. In one embodiment, the first predetermined number is 1, and the second predetermined number is 4, but it is not limited thereto. In other embodiments, the first predetermined number and the second predetermined number can be also other values determined by the circuit designer. The process ends at step S806.

As described above, the data storage device 140 and the data writing method of the present invention can avoid trying to repeatedly execute the interrupted write operation of a TLC block in the continuously power-off event.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, having a plurality of Triple Level Cell (TLC) blocks, wherein each of the TLC blocks comprises a plurality of pages; and
a controller, stopping the writing of data into a first TLC block which was undergoing a write operation that had not finished at the time a power-off event occurred, when the data storage device resumes operation after the power-off event, and writing valid data of the first TLC block into a second TLC block after every interval of a first predetermined number of write command(s) is finished, wherein the controller writes the valid data of the first TLC block into at least one page of the second TLC block and clears a maximum programming time in sequence until the second TLC block is filled, and wherein the maximum programming time is arranged to limit the time it takes for the controller to write the SLC blocks and the TLC blocks.

2. The data storage device as claimed in claim 1, wherein the flash memory further comprises a plurality of Single Level Cell (SLC) blocks, and each of the SLC blocks comprises a plurality of pages, wherein the write operation of the first TLC block is arranged to program data of a second predetermined number of SLC blocks into the first TLC block, and the first predetermined number of write command(s) is arranged to write data into one of the SLC blocks.

3. The data storage device as claimed in claim 1, wherein the first predetermined number is 1.

4. The data storage device as claimed in claim 1, wherein when the second TLC block is filled, the controller writes valid data of a third predetermined number of SLC blocks into the other TLC blocks after every interval of a second predetermined number of write commands is finished.

5. The data storage device as claimed in claim 4, wherein the first predetermined number is less than the second predetermined number.

6. A data storage device, comprising:
a flash memory, having a plurality of Single Level Cell (SLC) blocks and a plurality of Triple Level Cell (TLC) blocks, wherein each of the SLC blocks comprises a plurality of pages, and each of the TLC block comprises a plurality of pages; and
a controller, writing valid data of a first TLC block into a second TLC block of the TLC blocks after every interval of a first predetermined number of write command(s) is finished in a first period which is subsequent to a power-off event after which the data storage device resumes operation, and writing a part of valid data of the other SLC blocks into the other TLC blocks after every interval of a second predetermined number of write commands is finished in a second period which is subsequent to the first period, wherein in the first period, the controller further clears a maximum programming time after each part of the valid data is written into the first TLC block.

7. The data storage device as claimed in claim 6, wherein the first TLC block was undergoing a write operation that had not finished at the time the power-off event occurred.

8. The data storage device as claimed in claim 6, wherein the first predetermined number is less than the second predetermined number.

9. A data writing method, applied to a data storage device, wherein the data storage device comprises a flash memory having a plurality of Triple Level Cell (TLC) blocks, the data writing method comprising:
when the data storage device resumes operation after a power-off event, checking whether any of the TLC blocks was undergoing a write operation that had not finished at the time the power-off event occurred;
when a first TLC block was undergoing a write operation that had not finished at the time the power-off event occurred, stopping the writing of data into the first TLC block, and selecting a second TLC block from the first TLC block; and
after the data storage device resumes operation after the power-off event, writing valid data of the first TLC block into a second TLC block after every interval of a first predetermined number of write command(s) is finished, wherein the step of writing the valid data of the first TLC block into the second TLC block further comprises writing the valid data of the first TLC block into at least one page of the second TLC block and clearing a maximum programming time in sequence until the second TLC block is filled, and wherein the maximum programming time is arranged to limit the time available for writing the SLC blocks and the TLC blocks.

10. The data writing method as claimed in claim 9, wherein the flash memory further comprises a plurality of Single Level Cell (SLC) blocks, wherein the write operation of the first TLC block is arranged to program data of a second predetermined number of SLC blocks into the first TLC block, and the first predetermined number of write command(s) is arranged to write data into one of the SLC blocks.

11. The data writing method as claimed in claim 9, wherein the first predetermined number is 1.

12. The data writing method as claimed in claim 9, further comprising:
when the second TLC block is filled, writing valid data of a third predetermined number of SLC blocks into the other TLC blocks after every interval of a second predetermined number of write commands is finished.

13. The data writing method as claimed in claim 12, wherein the first predetermined number is less than the second predetermined number.

14. A data writing method, applied to a data storage device, wherein the data storage device comprises a flash memory having a plurality of Single Level Cell (SLC) blocks and a plurality of Triple Level Cell (TLC) blocks, the data writing method comprising:
in a first period which is subsequent to a power-off event after which the data storage device resumes operation, writing valid data of a first TLC block into a second TLC block of the TLC blocks after every interval of a first predetermined number of write command(s) is finished;
in a second period which is subsequent to the first period, writing a part of the valid data of the other SLC blocks into the other TLC blocks after every interval of a second predetermined number of write commands is finished; and
clearing a maximum programming time after each part of the valid data is written into the first TLC block in the first period.

15. The data writing method as claimed in claim 14, wherein the first TLC block was undergoing a write operation that had not finished at the time the power-off event occurred.

16. The data writing method as claimed in claim 14, wherein the first predetermined number is less than the second predetermined number.

* * * * *